United States Patent [19]

Besecke et al.

[11] Patent Number: 4,472,570

[45] Date of Patent: Sep. 18, 1984

[54] POLYARYLENE ESTERS CONTAINING PHOSPHORUS

[75] Inventors: Siegmund Besecke, Seeheim-Jugenheim; Guenter Schroeder, Ober-Ramstadt; Werner Ude, Darmstadt-Arheilgen; Winfried Wunderlich, Rossdorf, all of Fed. Rep. of Germany

[73] Assignee: Rohm GmbH, Darmstadt, Fed. Rep. of Germany

[21] Appl. No.: 516,046

[22] Filed: Jul. 22, 1983

[30] Foreign Application Priority Data

Aug. 24, 1982 [DE] Fed. Rep. of Germany ....... 3231331

[51] Int. Cl.$^3$ .............................................. C08G 63/68
[52] U.S. Cl. ..................... 528/167; 528/125; 528/126; 528/128; 528/169; 528/398
[58] Field of Search ............... 528/167, 169, 398, 125, 528/126, 128

[56] References Cited

U.S. PATENT DOCUMENTS

| | | | |
|---|---|---|---|
| 4,255,555 | 3/1981 | Salee et al. | 528/167 |
| 4,278,785 | 7/1981 | Rosenfeld | 528/167 |
| 4,328,174 | 5/1982 | Schmidt et al. | 260/930 |

FOREIGN PATENT DOCUMENTS 2925206 1/1981 Fed. Rep. of Germany .
8165020 6/1981 Japan .

OTHER PUBLICATIONS

Chem. Abstr. 96, 86163x (1982).

*Primary Examiner*—Lester L. Lee
*Attorney, Agent, or Firm*—Curtis, Morris & Safford

[57] ABSTRACT

What are disclosed are resinous polyarylene esters containing more than 1 percent by weight of phosphorus and having the formula $-(CO-A-CO-O-B-O)_{\overline{n}}$, wherein B is a bivalent aromatic group and A represents at least in part $$-\text{phenylene}-P(O)_x(R)-\text{phenylene}-,$$

wherein R is lower alkyl or aryl and x is 0 or 1, the rest, if any, of A having the formula given for B, which esters have decomposition temperatures of at least 450° C. and can be sintered or thermoplastically processed into sheets or other shapes having good self-extinguishing properties.

8 Claims, No Drawings

POLYARYLENE ESTERS CONTAINING PHOSPHORUS

The present invention relates to polyarylene esters containing phosphorus, which esters are of interest as highly heat resistant and flame retardant thermoplastic materials.

Polyester phosphonates are known from published German patent application DOS No. 29 25 206 which, from the point of view of their properties, belong to the class of synthetic resins. However, because of their content of phosphonic ester groups, they are dissociated fairly easily by hydrolysis.

Polyarylene esters containing phosphorus are described in published Japanese patent application No. 81 65020 and in an article by Kondo et al. [European Polymer Journal, 17, 583–588 (1981)]. They contain the phosphorus atoms in five- or six-membered ring structures which impart pronounced stiffness to the polymer molecule. This results in high softening temperatures which make it necessary to process these materials at temperatures close to their decomposition temperature.

Hashimoto et al. [Kobunshi Kagaku, Eng. Ed., 2, 826–834 (1973)] have prepared phosphorus-containing polyarylene esters of the structure

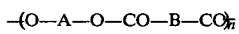

by the Schotten-Baumann condensation of aliphatic or aromatic carboxylic acid chlorides, ClCO—B—COCl, wherein B represents an aliphatic or aromatic group, with phosphorus-containing bisphenols, HO—A—OH, wherein A represents a group of the structure

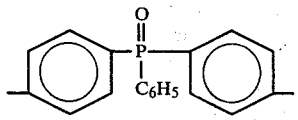

The polyarylene esters obtained tend to crystallize, which raises their melting temperature. The melting temperature of a polyarylene ester with the structure described above, wherein "B" stands for para-phenylene, is about 300° C. On the other hand, the melting temperature of a co-condensate in which about 30 percent of the groups "A" are replaced by bisphenol A groups is only about 250° C. This reduction of the melting temperature, though desirable from the viewpoint of processability, falls short of being adequate, and it can be had only at the expense of a decrease in the phosphorus content by 28 percent.

Phosphorus-containing polyarylene polyesters of the structure —(O—A—O—CO—B—CO)—$_n$, wherein A, B and n have the same meanings as in the present application, are also known. However, these polyesters do not contain groups derived from dicarboxylic acids containing phosphorus.

In Polymer Science USSR, 1, 124 (1960), Vinogradova et al. have described polyarylene polyesters containing phosphorus derived from the phosphorus-containing dicarboxylic acid

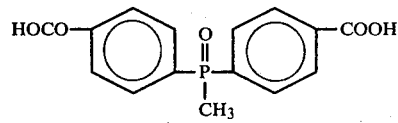

and from an aliphatic or araliphatic diol which carries aliphatically bound hydroxyl groups. Most of the polycondensates described have a very low melt viscosity and no synthetic resin properties. A polyester derived from

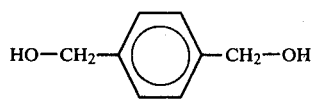

has the highest molecular weight, 15,600. When the pulverulent condensation product is sintered in air at about 300° C., a slightly foamed, friable black mass is obtained which lacks strength and possesses no synthetic resin properties, probably due to inadequate thermal stability of the polycondensate.

The object of the present invention is to increase the heat resistance of polyarylene esters containing phosphorus to such an extent that they can be sintered into a homogeneous material having resin properties without decomposing and without appreciably discoloring. In accordance with the invention, this object is accomplished through phosphorus containing polyarylene esters of the structure

wherein A represents at least in part groups of the structure

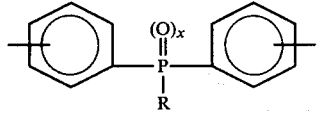

wherein R is lower alkyl, aryl, or aralkyl, preferably phenyl, x is zero or 1, preferably 1, and the aryl groups optionally may have further substituents. The rest, if any, of A is made up of groups of the structure given for B. B, in turn, represents

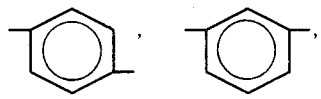

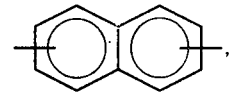

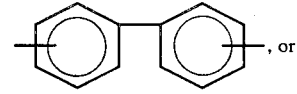

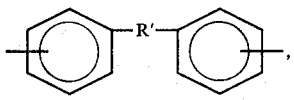

wherein R' is an oxygen atom, a sulfur atom, or a sulfonyl, carbonyl, or isopropylidene bridging group, or a bridging group of the structure

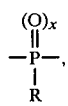

wherein x and R have the meanings given earlier, n has an average value greater than 10 and preferably greater than 20, and the phosphorus content of the polyarylene esters is over 1 weight percent. Other values of R' include hydrocarbon and oxyhydrocarbon groups having 5 to 15 carbon atoms and a number of hydrogen atoms which is at most equal to the number of carbon atoms, e.g.

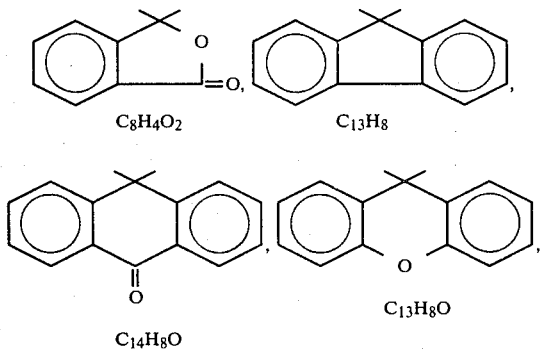

The aromatic rings may optionally carry further substituents.

The polyesters in accordance with the invention have decomposition temperatures ranging from 400° C. to over 450° C. and, thus, can be sintered into clear, transparent synthetic resin-like materials without decomposing and without appreciably darkening. Their pyrolysis residue values ("CR values") are markedly higher than those of other polyarylene polyesters containing phosphorus. According to van Krevelen ("Properties of Polymers", Elsevier Scientific Publishing Co., 1976, pp. 528–532), the pyrolysis residue value or CR value is a measure of the self-extinguishing properties. There is a quantitative relationship between the CR value and the "oxygen index", which latter gives the lowest oxygen concentration required to maintain combustion. Some of the polyesters of the invention have CR values over 40 whereas the prior art polyarylene esters containing phosphorus derived from aliphatic or araliphatic diols have CR values ranging from 5 to 30 percent. The polyester phosphonates according to published German patent application DOS No. 29 25 206 have CR values as high as 38 percent; however, the P-O-C bond of these polymers is susceptible to hydrolysis.

The new polyarylene esters can be processed in the thermoplastic state below their thermal decomposition temperature, i.e. at temperatures ranging from about 200° C. to 380° C., into sheets, fibers, sections, or other shapes which are distinguished by good self-extinguishing properties. They can also be processed into self-extinguishing mixtures with other thermoplastic materials which in themselves are not self-extinguishing. Whereas low molecular weight flame retardant additives do not impart adequate self-extinguishing properties when used in small amounts and have a decidedly adverse effect on the properties of synthetic resins when used in large amounts, the polyesters in accordance with the invention, which themselves have synthetic resin properties, have a lesser effect on the properties of a resin material with which they are mixed.

The dicarboxylic acid, HOCO—A—COOH, which enters into the composition of the polyarylene esters in accordance with the invention is formed at least in part of compounds of the structure

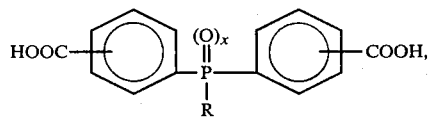

R may be a methyl, chloromethyl, benzyl, or phenyl group, for example. Methyl and phenyl are preferred. The aromatic groups of the compound may optionally carry further substituents, such as fused aromatic ring systems, methyl groups, or halogen atoms, particularly bromine or chlorine. The carboxyl groups are preferably in a position para to the phosphorus atom. The oxidized form of the compound, wherein x is 1, is preferred. The preparation of these dicarboxylic acids has been described by Morgan et al. in Jour. Am. Chem. Soc. 74, 4526 (1952). They can be conventionally converted with thionyl chloride into their dicarboxylic acid dichlorides.

The phosphorus containing groups A may be partially replaced by the phosphorus free groups defined for B. While this will reduce the phosphorus content of the polyarylene ester, it will also reduce its tendency to crystallize. A limit is imposed on the proportion of the phosphorus free groups A and B in that the phosphorus content must not be less than 1 weight percent. It is preferably over 2 weight percent, usually over 4 weight percent, and more particularly between 5 and 7 percent. The amount of the phosphorus containing groups A is preferably over 50 mole percent, and more particularly over 70 mole percent, of the total of groups A.

The bisphenols, HO—B—OH, on which the polyarylene esters are formally based and which account for their advantageous properties, are either polynuclear aromatic diols linked by bridging groups R' or, if they do not have this structure, preferably mixtures of two or more of the other bisphenols identified by the formula, whereby the tendency of the polyesters toward crystallization is inhibited and their melting temperature is reduced as desired. The full melting temperature reducing effect is usually obtained with just two different acids of the type last mentioned. The effect is promoted by marked structural differences between the groups B involved. The amount of each type of groups B is preferably not less than 10 mole percent, based on the total groups B. Amounts ranging from 25 to 75 weight percent, and particularly a ratio of 50:50, are preferred.

The polyarylene esters are prepared in principle by polycondensation of a bisphenol, HO—B—OH, with an aromatic dicarboxylic acid, HOOC—A—COOH, or by polycondensation of functional derivatives of these reagents which are capable of forming ester groups. A Schotten-Baumann reaction between the bisphenols, HO—B—OH, and dicarboxylic acid dichlorides, ClCO—A—COCl, in the presence of an at least equivalent amount of a base in an appropriate solvent is particularly advantageous. Suitable solvents are, for example, chlorinated aliphatic hydrocarbons such as methylene chloride, chloroform, tetrachloroethylene, and tetrachloroethane, or aromatic hydrocarbons such as toluene. Sodium or potassium hydroxide, pyridine, and triethylamine are suitable bases. The reaction temperature may range from 0° to 150° C. and preferably ranges from 20° to 100° C.

To obtain a high molecular weight, and hence good synthetic resin properties, the purity of the starting compounds should be as high as possible. In particular, there should be no monofunctional impurities which enter into the reaction but act as chain stoppers. For the same reason, the molar ratio between the bisphenols and the total dicarboxylic acid derivatives should be very close to 1:1, as is generally known from the chemistry of polycondensation reactions. The degree of polycondensation should be greater than 10, and preferably greater than 20. The molecular weight of the polyarylene esters preferably is not less than 10,000 but ranges from 20,000 to 80,000. To obtain such molecular weights, condensation times between 0.1 and 10 hours will be required. Often the resin properties, and especially the strength properties, of the products can be improved further by secondary condensation for from 10 to 90 minutes at from 250° to 350° C., optionally under vacuum. The linear macromolecules formed usually contain hydroxyl or carboxyl groups as terminal groups, which, if desired, may subsequently be etherified or esterified. Minor amounts of monofunctional phenols or carboxylic acid may also be selectively added for the formation of terminal groups.

The preferred polymer molecules usually remain dissolved during the condensation while the hydrochloride of the base precipitates and can be filtered off. The polymer can be recovered by precipitation with a nonsolvent, for example, or by evaporation of the solvent.

Further possibilities for the synthesis of the new polyarylene esters are condensation processes known from the literature, for example melt condensation by reaction of the corresponding bisphenol diacetates and dicarboxylic acids, or reaction of the bisphenols with dicarboxylic phenyl esters. A drawback of these methods is the protracted heating of the condensation batches to high temperatures, which may reach 350° C. over 10 hours, and the need to eliminate low molecular weight compounds, split off during the condensation, by distillation from the highly viscous reaction mixtures.

Some of the polyesters prepared in accordance with the examples which follow are soluble in organic solvents such as methylene chloride while others are insoluble because of a pronounced tendency to crystallize. The soluble polyesters can be recovered directly from the condensation solution with high molecular weights, which can be increased further by secondary condensation. Their distinct synthetic resin properties, such as toughness, flexibility, elasticity, etc., indicate a degree of polycondensation, n, far above 20. The insoluble, more or less crystalline, polyesters acquire similar resin properties only through secondary condensation.

Polyesters with a low degree of polycondensation ($n = 10$ to $20$) have little strength and elasticity and are suitable primarily for use as components for admixture with other polymers. Below a degree of polycondensation of 10, typical resin properties are not obtained, and when mixed with other polymers such condensates may act as plasticizers.

A better understanding of the present invention and of its many advantages will be had by referring to the following specific examples, given by way of illustration.

EXAMPLES 1 to 9

0.03 mole of a bisphenol (as indicated in Table I) and 0.09 mole of triethylamine were dissolved in 250 ml each of methylene chloride (with the addition of small amounts of pyridine, where necessary). 0.03 mole of a dicarboxylic acid dichloride (as indicated in Table I) was added dropwise to this solution at a temperature from 0° to 25° C. with stirring. Stirring was then continued for 2 hours at room temperature. After the addition of 2 mole percent of bisphenol (based on the molar amount of bisphenol originally used) and further reaction for 10 minutes, the polycondensation was terminated by the addition of 5 mole percent of acetyl chloride (based on the amount of dicarboxylic acid dichloride used). By stirring the reaction mixture into 5 to 10 times its volume of methanol or, if the precipitate was swollen and tacky, into aqueous methanol with up to 50% water, the polyester formed was precipitated. It was then filtered off by suction, washed free of chloride, optionally reprecipitated from methylene chloride/methanol, and dried.

The value of n in Example 1 is 62; in Example 2, 55; in Example 3, 15; and in Example 7, 25. In all other Examples, including the Comparison Examples, n is greater than 20. The molecular weight of the polyesters obtained may be increased further, if desired, by secondary condensation in bulk, for example by heating for 6 to 180 minutes at 300° to 350° C.

TABLE I

Polyesters of Bis(para-phenylcarbonyl chloride)phenylphosphine Oxide and Various Bisphenols

| Example No. | Bisphenol HO—B—OH Structure of B: | Phosphorus content [%] Theor. | Phosphorus content [%] Found | Glass transition temperature* [°C.] | Decomposition temperature** Incipient decomposition [°C.] | Decomposition temperature** Marked decomposition [°C.] | CR value*** [%] |
|---|---|---|---|---|---|---|---|
| Comparison example | —CH$_2$—⌬—CH$_2$— | 6.6 | 6.1 | 160 | 160 | 360 | 30 |
| 1 | —⌬—O—⌬— | 5.8 | 5.6 | 195 | 350 | 450 | 43.8 |

TABLE I-continued

Polyesters of Bis(para-phenylcarbonyl chloride)phenylphosphine Oxide and Various Bisphenols

| Example No. | Bisphenol HO—B—OH Structure of B: | Phosphorus content [%] Theor. | Phosphorus content [%] Found | Glass transition temperature* [°C.] | Decomposition temperature** Incipient decomposition [°C.] | Decomposition temperature** Marked decomposition [°C.] | CR value*** [%] |
|---|---|---|---|---|---|---|---|
| 2 | (bisphenol A: C(CH$_3$)$_2$ bridged diphenyl) | 5.6 | 4.8 | — | 350 | 440 | 28.9 |
| 3 | (P(=O)(phenyl) bridged diphenyl) | 9.7 | 8.9 | 235 | 375 | 450 | 42.8 |
| 4 | (biphenyl) | 6.0 | 5.4 | 180 | 360 | 430 | 37.5 |
| 5 | (SO$_2$ bridged diphenyl) | 5.3 | 4.8 | 160 | 350 | above 450 | 35.5 |
| 6 | (phenylene) | 7.0 | 6.6 | 173 | 350 | 450 | 41.5 |
| 7 | (phenolphthalein structure) | 4.8 | 4.4 | 265 | 380 | 450 | 40.2 |
| 8 | (biphenyl) | 6.0 | 5.4 | 180 | — | — | 36.7 |
| 9 | (C=O bridged diphenyl) | — | — | 195 | 390 | 430 | 42.9 |
| 10 | (dimethylnaphthalene) | — | — | 225 | 330 | 400 | 52.6 |

*As determined by differential scanning calorimetry (DSC) under N$_2$
**As determined by thermogravimetric analysis (TGA) under N$_2$
***Pyrolysis residue after 30 minutes at 800° C. under N$_2$

TABLE II

| | STARTING COMPOUNDS | STARTING COMPOUNDS | POLYESTER PROPERTIES | POLYESTER PROPERTIES | POLYESTER PROPERTIES | POLYESTER PROPERTIES | POLYESTER PROPERTIES |
|---|---|---|---|---|---|---|---|
| | | | | Decomposition temperature[4] | Decomposition temperature[4] | | |
| Example | Bisphenol[1] (mole) | Dicarboxylic acid dichlorides[2] (mole) | Glass transition temperature[3] [°C.] | Incipient decomposition [°C.] | Marked decomposition [°C.] | CR value[5] % | Phosphorus content [%] |
| 11 | O (1) | TPPO (0.3) TPA (0.7) | 110 (T$_M$ = 223° C.) | 325 | above 450 | 35.4 | 2.4 |
| 12[6] | A (1) | TPPO (0.3) TPA (0.7) | 160 | | 440 | 29.7 | 2.2 |
| 13 | O (1) | TPPO (0.3) TPA (0.35) IPA (0.35) | 150 | | above 450 | 32.1 | 2.4 |
| 14 | O (1) | TPPO (0.3) OPhA (0.7) | 115 (T$_M$ = 255° C.) | 390 | 460 | 39.2 | 2.1 |
| Comparison example | O (1) | OPhA (0.7) Phenoxa-TPPO (0.3) | 207 | 300 | 450 | 30.5 | 2.1 |
| Comparison | O (1) | TPA (0.7) | 210 | 290 | 450 | 28.9 | 2.2 |

TABLE II-continued

| | STARTING COMPOUNDS | | POLYESTER PROPERTIES | | | | |
|---|---|---|---|---|---|---|---|
| | | | | Decomposition temperature[4] | | | |
| Example | Bisphenol[1] (mole) | Dicarboxylic acid dichlorides[2] (mole) | Glass transition temperature[3] [°C.] | Incipient decomposition [°C.] | Marked decomposition [°C.] | CR value[5] % | Phosphorus content [%] |
| example | | Phenoxa-TPPO (0.3) | | | | | |

Legend for Table II
[1]Bisphenol O = 4,4'-dioxydiphenyl ether; bisphenol A = 4,4'-isopropylidene bisphenol
[2]TPPO = Bis(para-phenylcarbonylchloride)phenylphosphine oxide
TPA = Terephthalic acid dichloride
IPA = Isophthalic acid dichloride
OPhA = Oxybis(para-phenylcarbonylchloride)
Phenoxa-TPPO = 2,8-dichloroformyl-10-phenylphenoxaphosphine-10-oxide
[3]As determined by DSC under $N_2$. (Values in parentheses are melting temperatures of partially crystalline polyesters.)
[4]As determined by TGA under $N_2$.
[5]Pyrolysis residue after 30 minutes at 800° C. under $N_2$
[6]Molecular weight: 50,100

What is claimed is:

1. A polyarylene ester polymer of the formula
$-(CO-A-CO-O-B-O)_n$,
said polymer having a phosphorus content greater that 1 percent by weight and having terminal groups which are hydroxyl or carboxyl groups, or are groups obtainable by reaction of said polymer with a monofunctional phenol or carboxylic acid, wherein A at least in part is defined by

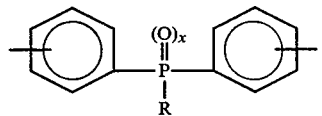

wherein R is lower alkyl, chlorinated lower alkyl, aryl, aryl substituted by methyl or halogen, or aralkyl, x is zero or 1, the balance, if any, of A having the formula B as defined below, n has an average value greater than 10, and wherein B is a bivalent aromatic group of the formula

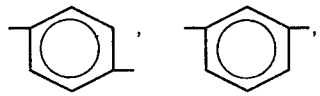

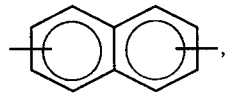

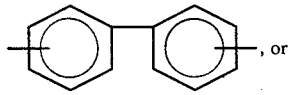, or

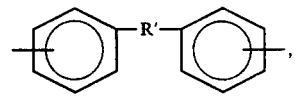

wherein R' is an oxygen atom, a sulfur atom, or a sulfonyl, carbonyl, or isopropylidene bridge, or is a bridge group of the formula

wherein x and R have their earlier meanings, or is a divalent hydrocarbon or oxyhydrocarbon having 5 to 15 carbon atoms and a number of hydrogen atoms which is at most equal to the number of carbon atoms.

2. An ester as in claim 1 wherein R is phenyl.
3. An ester as in claim 1 wherein x is 1.
4. An ester as in claim 1 wherein R' is

5. An ester as in claim 4, wherein R is phenyl.
6. An ester as in claim 4 wherein x is 1.
7. A method for making a phosphorus containing polyarylene ester as in claim 1 which comprises polycondensing a bisphenol, HO—B—OH, with an aromatic dicarboxylic acid, HOCO—A—COOH, or polycondensing a functional derivative of said bisphenol or said dicarboxylic acid capable of condensing with formation of ester groups.
8. A method as in claim 7, wherein a carboxylic acid chloride, ClCO—A—COCl, of said dicarboxylic acid is polycondensed and said polycondensation is carried out in the presence of an amount of a base at least equimolar to the carboxylic acid chloride groups.

* * * * *